J. W. WALLS, Jr.
SIPHON DISCHARGE FLUSHING CISTERN.
APPLICATION FILED SEPT. 15, 1908.
926,155. Patented June 29, 1909.
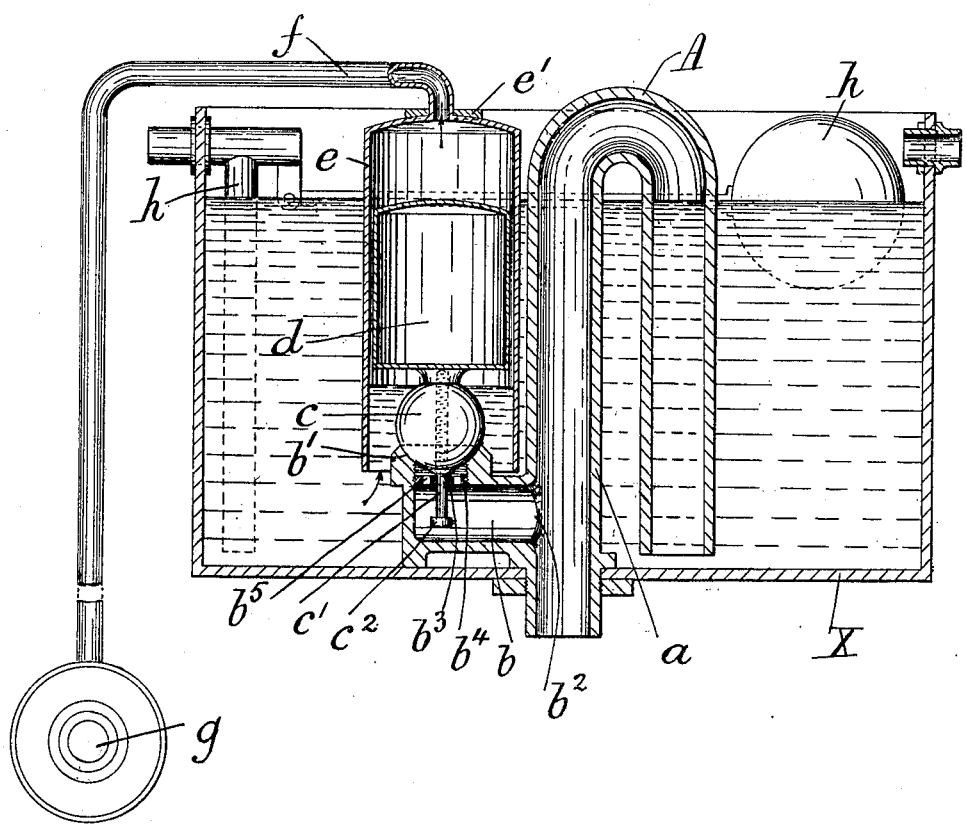
WITNESSES.
INVENTOR
John William Walls Jr.

UNITED STATES PATENT OFFICE.

JOHN WILLIAM WALLS, JR., OF CHESHUNT, ENGLAND.

SIPHON-DISCHARGE FLUSHING-CISTERN.

No. 926,155.      Specification of Letters Patent.      Patented June 29, 1909.

Application filed September 15, 1908. Serial No. 453,136.

*To all whom it may concern:*

Be it known that I, JOHN WILLIAM WALLS, Jr., a subject of the King of Great Britain and Ireland, and a resident of Cheshunt, England, have invented certain new and useful Improvements in Siphon-Discharge Flushing-Cisterns; and I do hereby declare the following to be a full, clear, and exact description of the same.

This invention relates to improvements in cisterns for flushing closets, lavatories and the like wherein a siphon is used for discharging the water and the starting of the siphonic action is controlled by pneumatic means leading from the cistern to a convenient point of actuation, and has for its object to improve the action of such cisterns and to simplify their construction.

The accompanying drawing represents a sectional elevation of a siphon-discharge flushing cistern adapted with the present improvements.

According to the invention, the long leg, $a$, of the siphon, A, is furnished, adjacent to the bottom of the cistern, X, with a water inlet branch, $b$, which opens into the cistern, at $b^1$, and opens into the siphon at $b^2$. The water inlet branch is controlled by a suitably guided gravity valve, $c$, which normally closes the latter. The valve is connected to a float, $d$, which is surrounded by an upright stationary bell-like chamber, $e$, which is open to the cistern interior, at a level preferably below that of the opening, $b^1$. The chamber communicates, at its upper part, by means of a conduit, $f$, with an air release, $g$, situated at a convenient point of operation.

$h$, is an ordinary ball cock for charging the cistern with water.

The valve, $c$, is preferably made of rubber for quietness of action, and may conveniently be formed of a spherical shape, as shown. The valve may be guided by a stem, $c^1$, which screws into the float and connects the valve thereto, and passes through and is adapted to slide in a guide hole, $b^3$, in an adjustable plate, $b^4$, which is provided with perforations, $b^5$, to leave a through-way for the water. The stem, $c^1$, may have a stop, $c^2$, to prevent the stem from becoming disengaged from the guide hole, $b^3$. The chamber, $e$, may be held in position by a bridge piece, $e^1$, and is preferably made cylindrical, and only just sufficient space is left between it and the float to allow the latter to freely rise and fall within the chamber, so that, when the air release is operated, the water quickly rises around the float in the chamber.

The operation of the improved apparatus is as follows,—By the operation of charging the cistern with water by the ball-cock, $h$, a body of air is imprisoned and compressed in the chamber, $e$, which prevents the water rising sufficiently in the latter to lift the float, $d$, and valve, $c$. When it is desired to flush the cistern, by operating the air release, $g$, air exhausts from the chamber, $e$, and the water at once rises therein sufficiently to lift the float, $d$, and valve, $c$, so as to open the water inlet, $b^1$, and thereby allow water to flow into the long leg, $a$, of the siphon and start its action, and as soon as the water level in the chamber, $e$, falls enough, the gravity valve reseats itself so as to close the water inlet, $b^1$.

If desired, the cistern may be used as a periodically operating automatic flushing cistern, by permanently keeping open the air release.

The invention is of advantage in relation to cisterns having mechanical devices for operating them, in avoiding the noise incidental to the use of the latter.

What I claim as my invention and desire to secure by Letters-Patent is,—

1. In a siphon-discharge flushing cistern, in combination, a water inlet branch leading from the cistern into the long leg of the siphon, a gravity valve adapted to close said water inlet branch, means for guiding said valve, a float for lifting said valve, an upright bell-like chamber open to the cistern interior at its lower part and surrounding said float, and means for opening the upper part of said chamber to the atmosphere, substantially as described.

2. In a siphon-discharge flushing cistern, in combination, a water inlet branch adjacent to the bottom of the cistern leading from the cistern into the long leg of the siphon, a gravity valve adapted to close said water inlet branch, means for guiding said valve, a float for lifting said valve, an upright bell-like chamber open to the cistern interior at its lower part and surrounding said float, so as to leave only a small space between the chamber and the float, and means for opening the upper part of said chamber to the atmosphere, substantially as described.

3. In a siphon-discharge flushing cistern, in combination, a water inlet branch opening into the cistern and into the long leg of the siphon adjacent to the bottom of the cistern, the opening into the cistern being formed as a valve seating, a spherical rubber gravity valve adapted to seat onto and to close said opening into the cistern, a float connected to said valve for lifting the latter, means for guiding and limiting the motion of said valve, an upright bell-like chamber open to the cistern interior at its lower part and surrounding said float, and means for opening the upper part of said chamber to the atmosphere, substantially as described.

In testimony whereof I affix my signature, in presence of two subscribing witnesses.

JOHN WILLIAM WALLS, Jr.

Witnesses:
  Tom Walls,
  Alfred Day.